(12) United States Patent
Fukudome et al.

(10) Patent No.: US 11,378,194 B2
(45) Date of Patent: Jul. 5, 2022

(54) CAPACITY CONTROL VALVE

(71) Applicant: Eagle Industry Co., Ltd., Tokyo (JP)

(72) Inventors: Kohei Fukudome, Tokyo (JP);
Masahiro Hayama, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/287,086

(22) PCT Filed: Nov. 6, 2019

(86) PCT No.: PCT/JP2019/043374
§ 371 (c)(1),
(2) Date: Apr. 20, 2021

(87) PCT Pub. No.: WO2020/095918
PCT Pub. Date: May 14, 2020

(65) Prior Publication Data
US 2021/0381610 A1   Dec. 9, 2021

(30) Foreign Application Priority Data

Nov. 7, 2018 (JP) .............................. JP2018-209951

(51) Int. Cl.
*F16K 21/04* (2006.01)
*F16K 11/22* (2006.01)
(Continued)

(52) U.S. Cl.
CPC .............. *F16K 11/22* (2013.01); *F04B 27/18* (2013.01); *F16K 11/24* (2013.01)

(58) Field of Classification Search
CPC ...... F16K 11/22; F04B 27/18; F04B 27/1804; F04B 2027/1831; F04B 2027/1868; F04B 2027/1881
See application file for complete search history.

(56) References Cited

U.S. PATENT DOCUMENTS 6,354,811 B1   3/2002   Ota et al. ................... 417/222.2
6,358,017 B1   3/2002   Ota et al. ................... 417/222.2
(Continued)

FOREIGN PATENT DOCUMENTS

EP   2784320   10/2014   .............. F04B 27/18
EP   3431760   1/2019   .............. F04B 27/18
(Continued)

OTHER PUBLICATIONS

International Search Report and Written Opinion issued in PCT/JP2019/002207, dated Apr. 23, 2019, with English translation, 13 pages.
(Continued)

*Primary Examiner* — Reinaldo Sanchez-Medina
(74) *Attorney, Agent, or Firm* — Hayes Soloway P.C.

(57) ABSTRACT

A capacity control valve includes a valve housing provided with a discharge port, a suction port, and a control port a rod driven by a solenoid; and a main valve that includes a main valve seat and a main valve body between the discharge port and the control port in accordance with a movement of the rod. The capacity control valve V further includes a CS valve that includes a CS valve seat and a CS valve body communication between the control port and the suction port. The CS valve body is disposed so as to be movable relative to the main valve body. The main valve body and the CS valve body move together in accordance with the movement of the rod while a closed state of the main valve is maintained.

16 Claims, 5 Drawing Sheets

(51) Int. Cl.
*F04B 27/18* (2006.01)
*F16K 11/24* (2006.01)

(56) References Cited

U.S. PATENT DOCUMENTS

| | | | |
|---|---|---|---|
| 6,361,283 B1 | 3/2002 | Ota et al. | 417/222.2 |
| 8,021,124 B2 | 9/2011 | Umemura et al. | 417/222.2 |
| 8,079,827 B2 | 12/2011 | Iwa et al. | 417/222.2 |
| 9,777,863 B2* | 10/2017 | Higashidozono | F04B 27/1804 |
| 11,053,933 B2* | 7/2021 | Warren | F04B 27/1804 |
| 11,085,431 B2* | 8/2021 | Fukudome | F04B 27/18 |
| 2004/0060604 A1 | 4/2004 | Uemura et al. | 137/595 |
| 2005/0035321 A1 | 2/2005 | Uemura | F16K 27/041 |
| 2006/0218953 A1 | 10/2006 | Hirota | 62/228.5 |
| 2007/0214814 A1 | 9/2007 | Umemura et al. | 62/228.1 |
| 2008/0138213 A1* | 6/2008 | Umemura | F04B 27/1804 417/222.2 |
| 2009/0183786 A1* | 7/2009 | Iwa | F04B 27/1804 137/487.5 |
| 2012/0198992 A1 | 8/2012 | Futakuchi et al. | 91/505 |
| 2012/0198993 A1 | 8/2012 | Fukudome et al. | F04B 27/18 |
| 2014/0130916 A1* | 5/2014 | Saeki | F04B 27/1804 137/625.48 |
| 2015/0004010 A1 | 1/2015 | Saeki | F04B 27/1804 |
| 2015/0068628 A1* | 3/2015 | Iwa | F16K 31/0613 137/625.65 |
| 2015/0211506 A1 | 7/2015 | Shirafuji et al. | F04B 27/1804 |
| 2015/0345655 A1* | 12/2015 | Higashidozono | F04B 27/1804 137/624.27 |
| 2016/0290326 A1* | 10/2016 | Sugamura | F04B 27/1804 |
| 2017/0028462 A1 | 10/2017 | Hayama et al. | F16K 47/06 |
| 2017/0356430 A1 | 12/2017 | Irie et al. | F04B 27/1804 |
| 2018/0291888 A1* | 10/2018 | Tonegawa | F16K 31/0624 |

FOREIGN PATENT DOCUMENTS

| | | | | |
|---|---|---|---|---|
| JP | 5-306679 | 11/1993 | | F04B 27/08 |
| JP | 6-200875 | 7/1994 | | F04B 27/08 |
| JP | 7-27049 | 1/1995 | | F04B 27/10 |
| JP | 9-144929 | 6/1997 | | F16K 31/06 |
| JP | 2000-345961 | 12/2000 | | F04B 27/14 |
| JP | 2001-73939 | 3/2001 | | F04B 27/14 |
| JP | 2001-132632 | 5/2001 | | F04B 27/14 |
| JP | 2003-42062 | 2/2003 | | F04B 27/14 |
| JP | 2006-52648 | 2/2006 | | F04B 27/14 |
| JP | 2006-307828 | 11/2006 | | F04B 27/14 |
| JP | 2007-247512 | 9/2007 | | F04B 27/14 |
| JP | 2008-14269 | 1/2008 | | F04B 27/14 |
| JP | 2008-202572 | 9/2008 | | F04B 27/14 |
| JP | 4242624 | 1/2009 | | F04B 49/00 |
| JP | 2011-32916 | 2/2011 | | F04B 27/14 |
| JP | 4700048 | 3/2011 | | F04B 49/00 |
| JP | 5167121 | 12/2012 | | F04B 27/14 |
| JP | 2014-118939 | 6/2014 | | F04B 27/14 |
| JP | 5557901 | 6/2014 | | F04B 27/14 |
| JP | 2014-190247 | 10/2014 | | F04B 27/14 |
| JP | 2016-196876 | 11/2016 | | F04B 27/18 |
| JP | 2017-129042 | 7/2017 | | F04B 27/18 |
| JP | 6206274 | 10/2017 | | F04B 27/18 |
| JP | 2017-223348 | 12/2017 | | F16K 11/10 |
| JP | 2018-21646 | 2/2018 | | F16K 31/06 |
| JP | 2018-40385 | 3/2018 | | F16K 31/06 |
| JP | 2018-145877 | 9/2018 | | F04B 39/14 |
| JP | 2019-2384 | 1/2019 | | F04B 27/18 |
| WO | WO2007119380 | 10/2007 | | F04B 27/14 |
| WO | WO2011021789 | 2/2011 | | F04B 27/14 |
| WO | WO2011135911 | 11/2011 | | F04B 27/14 |
| WO | WO2013109005 | 7/2013 | | F04B 49/06 |
| WO | WO2013176012 | 11/2013 | | F04B 27/14 |
| WO | WO2014091975 | 6/2014 | | F04B 27/14 |
| WO | WO2014119594 | 8/2014 | | F04B 27/14 |
| WO | WO2016104390 | 6/2016 | | F16K 31/06 |
| WO | WO2017057160 | 4/2017 | | F04B 27/18 |
| WO | WO2017159553 | 9/2017 | | F04B 27/18 |
| WO | WO2018207461 | 11/2018 | | F04B 27/18 |
| WO | WO2019167912 | 9/2019 | | F04B 27/18 |

OTHER PUBLICATIONS

International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24m, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.

(56) References Cited

OTHER PUBLICATIONS

International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.

* cited by examiner

CAPACITY CONTROL VALVE

TECHNICAL FIELD

The present invention relates to a capacity control valve that variably controls the displacement of a working fluid, for example, to a capacity control valve that controls the discharge amount of a variable displacement compressor, which is used in an air conditioning system of an automobile, according to pressure.

BACKGROUND ART

A variable displacement compressor used in an air conditioning system of an automobile or the like includes a rotary shaft that is rotationally driven by an engine; a swash plate that is coupled to the rotary shaft such that the inclination angle of the swash plate with respect thereto is variable; a piston for compression coupled to the swash plate; and the like. When the inclination angle of the swash plate is changed, the stroke amount of the piston is changed to control the discharge amount of a fluid. The capacity control valve, of which the opening and closing is driven by electromagnetic force, appropriately controls the internal pressure of a control chamber while using a suction pressure Ps of a suction chamber that suctions the fluid, a discharge pressure Pd of a discharge chamber that discharges the fluid pressurized by the piston, and a control pressure Pc of the control chamber that accommodates the swash plate, so that the inclination angle of the swash plate can be continuously changed.

During continuous driving of the variable displacement compressor (hereinafter, may be simply referred to as "during continuous driving"), the capacity control valve performs normal control where a valve body is moved in an axial direction by electromagnetic force which is generated in a solenoid when energization is controlled by a control computer, so that a main valve is opened and closed and the pressure of the discharge chamber is supplied to the control chamber to adjust the control pressure Pc.

During normal control of the capacity control valve, the pressure of the control chamber in the variable displacement compressor is appropriately controlled and the inclination angle of the swash plate with respect to the rotary shaft is continuously changed, so that the stroke amount of the piston is changed to control the discharge amount of the fluid to the discharge chamber; and thereby, the cooling capacity of the air conditioning system is adjusted to a desired cooling capacity. In addition, when the variable displacement compressor is driven at the maximum capacity, the main valve of the capacity control valve is closed to lower the pressure of the control chamber, so that the inclination angle of the swash plate is maximized.

In addition, there is known a configuration where an auxiliary communication passage through which a control port and a suction port of the capacity control valve communicate with each other is formed, and a refrigerant of the control chamber of the variable displacement compressor during startup is discharged to the suction chamber of the variable displacement compressor through the control port, the auxiliary communication passage, and the suction port to quickly lower the pressure of the control chamber during startup; and thereby, the responsiveness of the variable displacement compressor is improved (refer to Patent Citation 1).

CITATION LIST

Patent Literature

Patent Citation 1: JP 5167121 B2 (page 7 and FIG. 2)

SUMMARY OF INVENTION

Technical Problem

However, according to Patent Citation 1, the fluid discharge function during startup is good, but during continuous driving of the variable displacement compressor, the auxiliary communication passage is in communication and the refrigerant flows from the control port into the suction port; and thereby, the compression efficiency is deteriorated, which is a problem.

The invention has been made in light of such a problem, and an object of the invention is to provide a capacity control valve having a good fluid discharge function during startup and a high compression efficiency.

Solution to Problem

In order to solve the foregoing problem, according to the present invention, there is provided a capacity control valve including: a valve housing provided with a discharge port through which a discharge fluid at a discharge pressure passes, a suction port through which a suction fluid at a suction pressure passes, and a control port through which a control fluid at a control pressure passes; a rod driven by a solenoid; and a main valve that includes a main valve seat and a main valve body to open and close communication between the discharge port and the control port in accordance with a movement of the rod. The capacity control valve further includes a CS valve that includes a CS valve seat and a CS valve body to open and close communication between the control port and the suction port. The CS valve body is disposed so as to be movable relative to the main valve body. The main valve body and the CS valve body move together in accordance with the movement of the rod while a closed state of the main valve is maintained. According to the aforesaid feature of the present invention, since the main valve body is disposed so as to be movable relative to the CS valve body, during normal control, the opening and closing of the main valve can be controlled in a state where the CS valve is closed, and in a maximum energized state, as the rod moves while a closed state of the main valve is maintained, the main valve body moves together with the CS valve body to open the CS valve and to cause the control port and the suction port to communicate with each other, so that the control pressure and the suction pressure can be maintained at equal pressure. Therefore, the capacity control valve having a good fluid discharge function during startup and a high compression efficiency can be provided.

It may be preferable that the CS valve body is externally fitted to the main valve body, and the main valve seat is formed in an inner peripheral surface of the CS valve body. According to this preferable configuration, since the main valve body is inserted into the CS valve body, the capacity control valve including the CS valve can be compactly configured, and the main valve body can move together the CS valve body while a closed state of the main valve is reliably maintained.

It may be preferable that the CS valve body is biased in a valve closing direction of the CS valve by biasing means.

According to this preferable configuration, since the CS valve body can reliably move to a closed valve position, the capacity control valve can immediately return from a maximum energized state to normal control.

It may be preferable that a sliding portion that is slidable against an outer peripheral surface of the main valve body is formed in an inner peripheral surface of the CS valve body. According to this preferable configuration, a passage between the discharge port and the suction port can be sealed with the sliding portion between the inner peripheral surface of the CS valve body and the outer peripheral surface of the main valve body.

It may be preferable that the CS valve body is provided with a communication passage that penetrates through the CS valve body in an axial direction. According to this preferable configuration, since the communication passage through which the control port and the suction port communicate with each other when the CS valve is opened and closed is formed in the CS valve body, the capacity control valve including the CS valve can be simply configured.

It may be preferable that the CS valve body is provided with a discharge communication hole and a suction communication hole that communicate with the discharge port and the suction port, respectively. According to this preferable configuration, the capacity control valve including the CS valve can be simply configured.

DESCRIPTION OF EMBODIMENTS

A mode for implementing a capacity control valve according to the invention will be described below based on an embodiment.

Embodiment

A capacity control valve according to an embodiment will be described with reference to FIGS. 1 to 5. In the following description, right and left sides of FIG. 2 as viewed from a front side are right and left sides of the capacity control valve.

A capacity control valve V of the invention is assembled into a variable displacement compressor M used in an air conditioning system of an automobile or the like to variably control the pressure of a working fluid (hereinafter, simply referred to as a "fluid") which is a refrigerant, so that the discharge amount of the variable displacement compressor M is controlled to adjust the cooling capacity of the air conditioning system to a desired cooling capacity.

Figure 1:
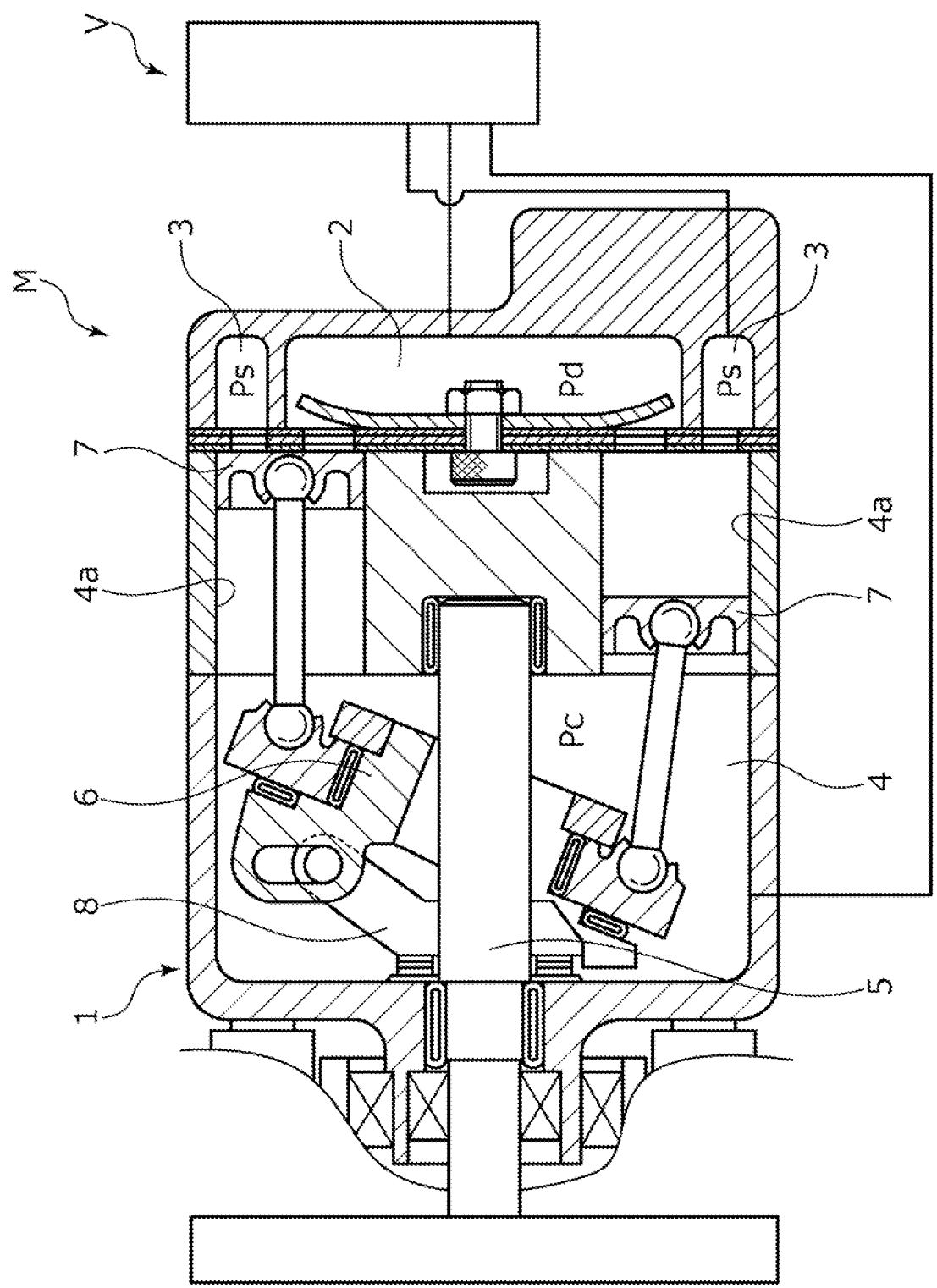
FIG. 1 is a schematic configuration view illustrating a swash plate-type variable displacement compressor into which a capacity control valve according to an embodiment of the invention is assembled.

First, the variable displacement compressor M will be described. As illustrated in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (unillustrated) through which the control chamber 4 and the suction chamber 3 communicate directly with each other, and the communication passage is provided with a fixed orifice that balances the pressures of the suction chamber 3 and the control chamber 4.

In addition, the variable displacement compressor M includes a rotary shaft 5 that is rotationally driven by an engine (unillustrated) installed outside the casing 1; a swash plate 6 that is eccentrically coupled to the rotary shaft 5 by a hinge mechanism 8 in the control chamber 4; and a plurality of pistons 7 that are coupled to the swash plate 6 and are reciprocatably fitted into the cylinders 4a. The capacity control valve V, of which the opening and closing is driven by electromagnetic force, appropriately controls the internal pressure of the control chamber 4 while using a suction pressure Ps of the suction chamber 3 that suctions the fluid, a discharge pressure Pd of the discharge chamber 2 that discharges the fluid pressurized by the pistons 7, and a control pressure Pc of the control chamber 4 that accommodates the swash plate 6, so that the inclination angle of the swash plate 6 is continuously changed; and thereby, the stroke amounts of the pistons 7 are changed to control the discharge amount of the fluid. Incidentally, for convenience of description, in FIG. 1, the capacity control valve V that is assembled into the variable displacement compressor M is unillustrated.

Specifically, the higher the control pressure Pc in the control chamber 4, the smaller the inclination angle of the swash plate 6 with respect to the rotary shaft 5, and thus the stroke amounts of the pistons 7 are reduced, and when the control pressure Pc is a certain pressure or higher, the swash plate 6 is substantially perpendicular to the rotary shaft 5, namely, is slightly inclined with respect to perpendicularity. In this case, since the stroke amounts of the pistons 7 are minimized and the pressurization of the fluid in the cylinders 4a by the pistons 7 is minimized, the discharge amount of the fluid to the discharge chamber 2 is reduced, and the cooling capacity of the air conditioning system is minimized. On the other hand, the lower the control pressure Pc in the control chamber 4, the larger the inclination angle of the swash plate 6 with respect to the rotary shaft 5, and thus the stroke amounts of the pistons 7 are increased, and when the control pressure Pc is a certain pressure or lower, the inclination angle of the swash plate 6 with respect to the rotary shaft 5 is maximized. In this case, since the stroke amounts of the pistons 7 are maximized and the pressurization of the fluid in the cylinders 4a by the pistons 7 is maximized, the discharge amount of the fluid to the discharge chamber 2 is increased, and the cooling capacity of the air conditioning system is maximized.

Figure 2:
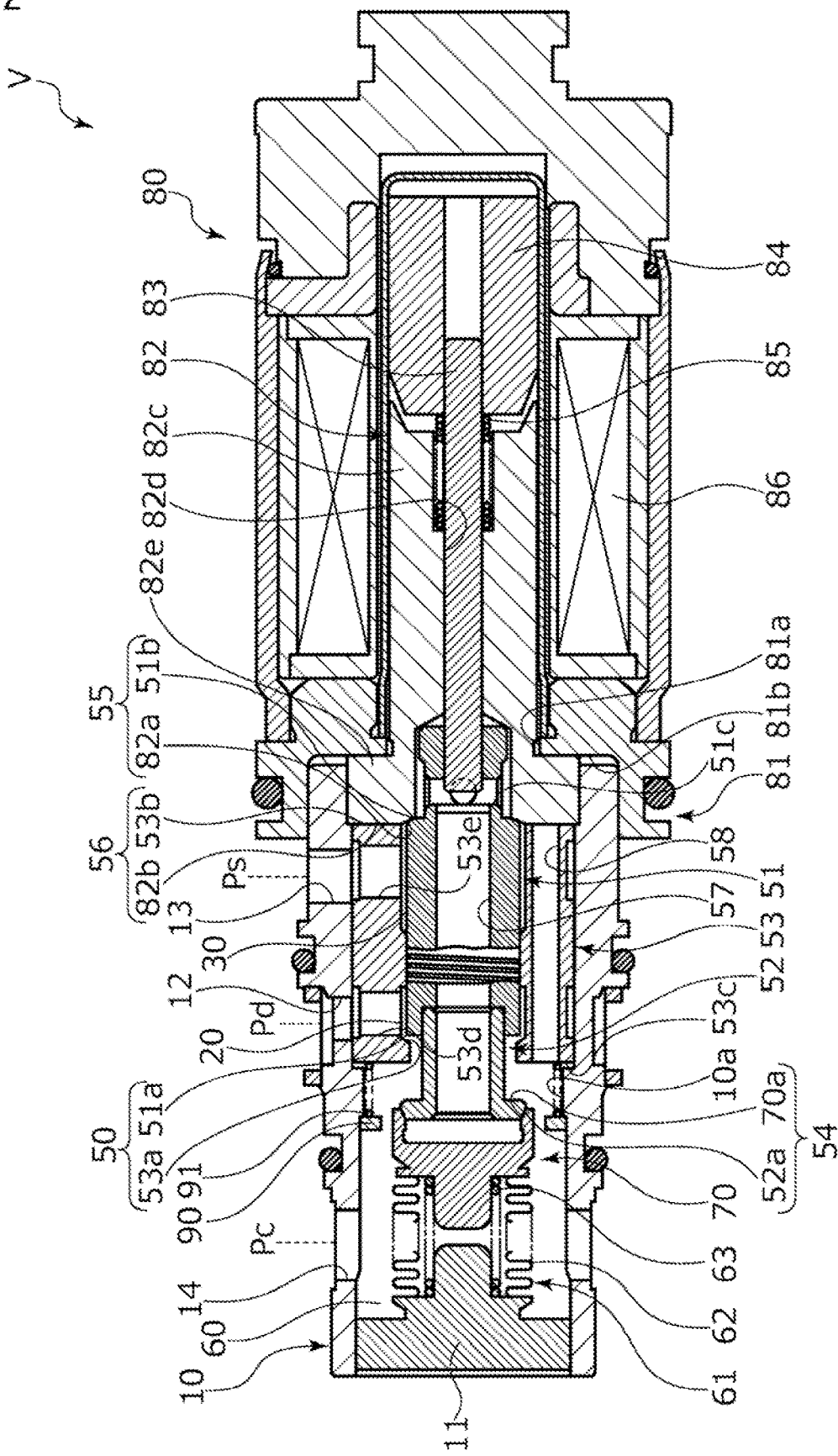
FIG. 2 is a cross-sectional view illustrating a state where a main valve is opened and a CS valve is closed when the capacity control valve according to the embodiment is in a de-energized state.

As illustrated in FIG. 2, in the capacity control valve V assembled into the variable displacement compressor M, a current with which a coil 86 forming a solenoid 80 is to be energized is adjusted to control the opening and closing of a main valve 50, an auxiliary valve 55, and a CS valve 56 in the capacity control valve V, namely, the opening and closing of valves that open and close communication between a control port and a suction port, and the opening and closing of a pressure sensitive valve 54 is controlled by the suction pressure Ps in an intermediate communication passage 57, so that the fluid flowing into the control chamber 4 or flowing out from the control chamber 4 is controlled; and thereby, the control pressure Pc in the control chamber 4 is variably controlled. Incidentally, hollow holes which are formed inside a main and auxiliary valve body 51 as a main valve body and a pressure sensitive valve member 52 are connected to each other, so that the intermediate communication passage 57 extends in an axial direction. Incidentally, the intermediate communication passage 57 communicates with an auxiliary valve chamber 30 (to be described later) via a plurality of through-holes 51c that penetrate through a right axial end portion of the main and auxiliary valve body 51 in a radial direction.

In the present embodiment, the main valve 50 includes the main and auxiliary valve body 51 and a main valve seat 53a that is formed in an inner peripheral surface of a CS valve body 53, and a left axial end 51a of the main and auxiliary valve body 51 comes into contact with and separates from the main valve seat 53a. The pressure sensitive valve 54 includes an adapter 70 forming a pressure sensitive body 61 and a pressure sensitive valve seat 52a formed at a left axial end of the pressure sensitive valve member 52, and a right axial end 70a of the adapter 70 comes into contact with and separates from the pressure sensitive valve seat 52a. The auxiliary valve 55 includes the main and auxiliary valve body 51 and an auxiliary valve seat 82a that is formed in an inner diameter portion of a left axial end surface which is an opening end surface of a fixed core 82, and a step portion 51b on a right side in the axial direction of the main and auxiliary valve body 51 comes into contact with and separates from the auxiliary valve seat 82a. The CS valve 56 includes the CS valve body 53 and a CS valve seat 82b that is formed in an outer diameter portion of the opening end surface of the fixed core 82, and a right axial end 53b of the CS valve body 53 comes into contact with and separates from the CS valve seat 82b.

Next, the structure of the capacity control valve V will be described. As illustrated in FIG. 2, the capacity control valve V mainly includes a valve housing 10 made of a metallic material or a resin material; the main and auxiliary valve body 51, the pressure sensitive valve member 52, and the CS valve body 53 that are disposed in the valve housing 10 so as to be reciprocatable in the axial direction; the pressure sensitive body 61 that applies rightward axial biasing force to the main and auxiliary valve body 51 and the pressure sensitive valve member 52 according to the suction pressure Ps in the intermediate communication passage 57; and the solenoid 80 that is connected to the valve housing 10 to apply driving force to the main and auxiliary valve body 51, the pressure sensitive valve member 52, and the CS valve body 53.

As illustrated in FIG. 2, the solenoid 80 mainly includes a casing 81 having an opening portion 81a that is open leftward in the axial direction; the fixed core 82 that has a substantially cylindrical shape, and is inserted into the opening portion 81a of the casing 81 from the left in the axial direction to be fixed to an inner diameter side of the casing 81; a drive rod 83 as a rod which is inserted into the fixed core 82 to be reciprocatable in the axial direction and of which a left axial end portion is inserted into and fixed to the main and auxiliary valve body 51; a movable core 84 that is fastened to a right axial end portion of the drive rod 83; a coil spring 85 that is provided between the fixed core 82 and the movable core 84 to bias the movable core 84 rightward in the axial direction; and the coil 86 for excitation that is wound around the outside of the fixed core 82 via a bobbin.

An inner diameter side of a left axial end of the casing 81 is recessed rightward in the axial direction to form a recessed portion 81b, and a right axial end portion of the valve housing 10 is inserted into and fixed to the recessed portion 81b in a substantially sealed manner.

The fixed core 82 is formed of a rigid body made of a magnetic material such as iron or silicon steel, and includes a cylindrical portion 82c provided with an insertion hole 82d into which the drive rod 83 extending in the axial direction is inserted, and a flange portion 82e that has an annular shape and extends outward in the radial direction from an outer peripheral surface of a left axial end portion of the cylindrical portion 82c. The auxiliary valve seat 82a that is recessed rightward in the axial direction is formed in the inner diameter portion of the opening end surface of the fixed core 82, namely, a left axial end surface of the cylindrical portion 82c, and the CS valve seat 82b is formed in the outer diameter portion of the opening end surface of the fixed core 82, namely, a left axial end surface of the flange portion 82e.

As illustrate in FIG. 2, the valve housing 10 is provided with a Pd port 12 as a discharge port communicating with the discharge chamber 2 of the variable displacement compressor M, a Ps port 13 as a suction port communicating with the suction chamber 3 of the variable displacement compressor M, and a Pc port 14 communicating with the control chamber 4 of the variable displacement compressor M. In addition, a partition adjustment member 11 is press-fitted into a left axial end portion of the valve housing 10 in a substantially sealed manner, so that the valve housing 10 has a substantially bottomed cylindrical shape. Incidentally, the partition adjustment member 11 can adjust the installation position in the axial direction of the valve housing 10 to adjust the biasing force of the pressure sensitive body 61.

In addition, the main and auxiliary valve body 51, the pressure sensitive valve member 52, and the CS valve body 53 are disposed in the valve housing 10 so as to be reciprocatable in the axial direction, and an annular protrusion portion 10a which protrudes inward in the radial direction and with which a left axial end 53c of the CS valve body 53 can come into contact is formed in a part of an inner peripheral surface of the valve housing 10. In addition, the CS valve body 53 having a substantially cylindrical shape is disposed closer to the right side in the axial direction than the annular protrusion portion 10a, and the CS valve body 53 is externally fitted to the main and auxiliary valve body 51 from the left in the axial direction, so that a main valve chamber 20 which communicates with the Pd port 12 and in which the left axial end 51a of the main and auxiliary valve body 51 is disposed, the auxiliary valve chamber 30 which communicates with the Ps port 13 and in which the right axial end portions of the main and auxiliary valve body 51 and the CS valve body 53 are disposed, and a pressure sensitive chamber 60 which communicates with the Pc port 14 and in which the pressure sensitive body 61 is disposed are formed.

Figure 3:
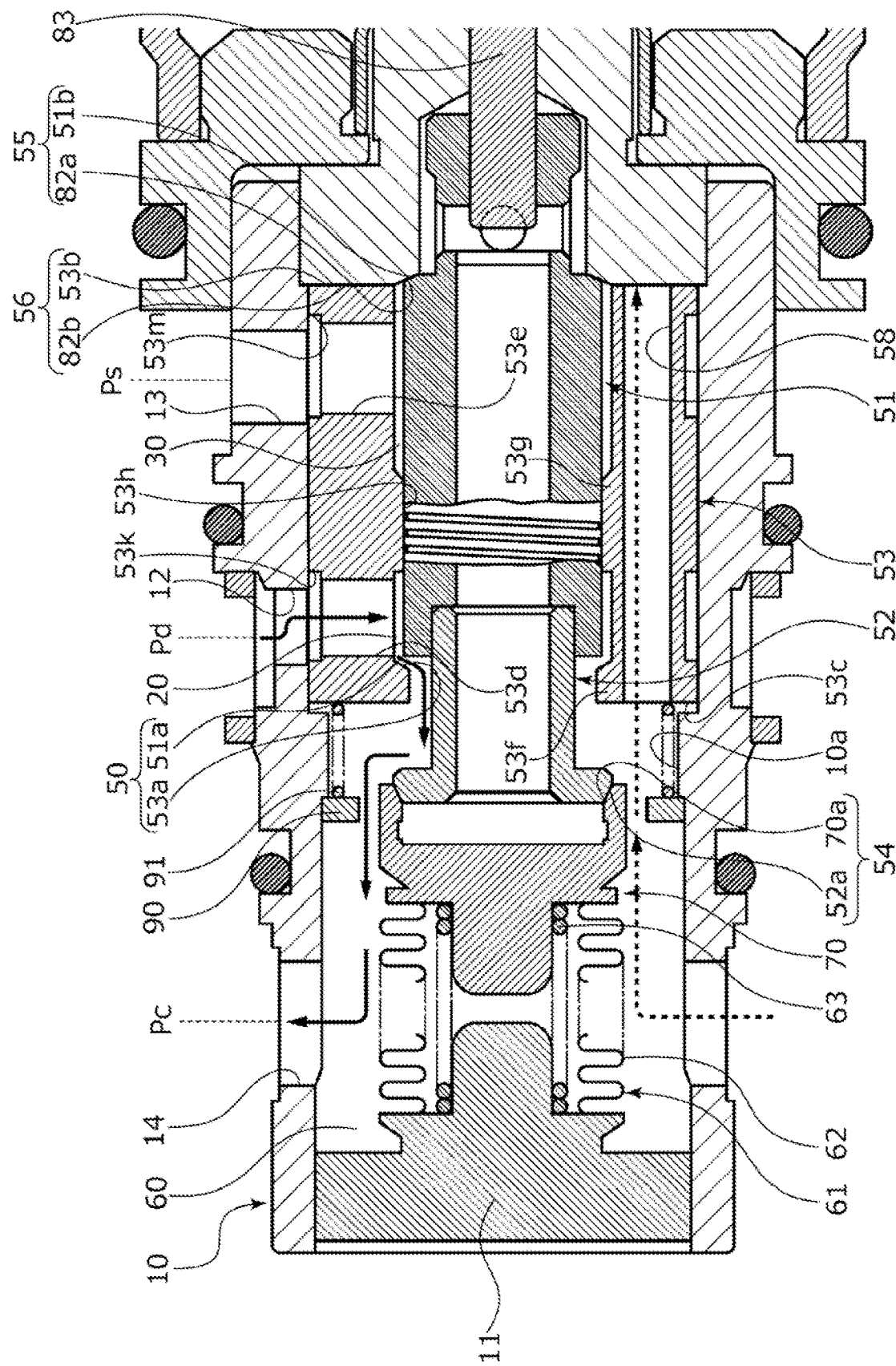
FIG. 3 is an enlarged cross-sectional view of FIG. 2 illustrating a state where the main valve is opened and the CS valve is closed when the capacity control valve according to the embodiment is in a de-energized state.
Figure 4:
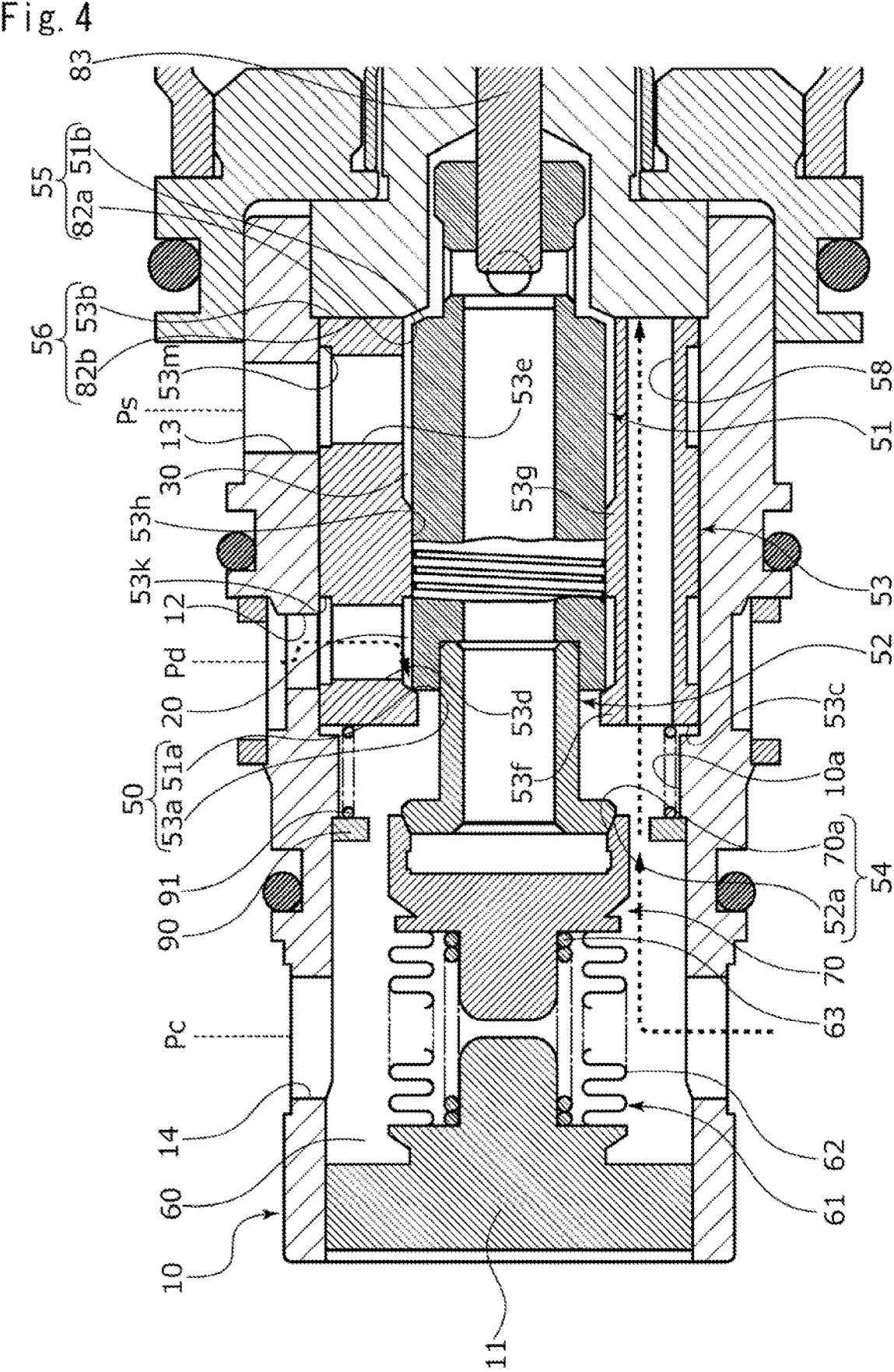
FIG. 4 is an enlarged cross-sectional view illustrating a state where the main valve and the CS valve are closed when the capacity control valve of the embodiment is in an energized state (e.g., during normal control).
Figure 5:
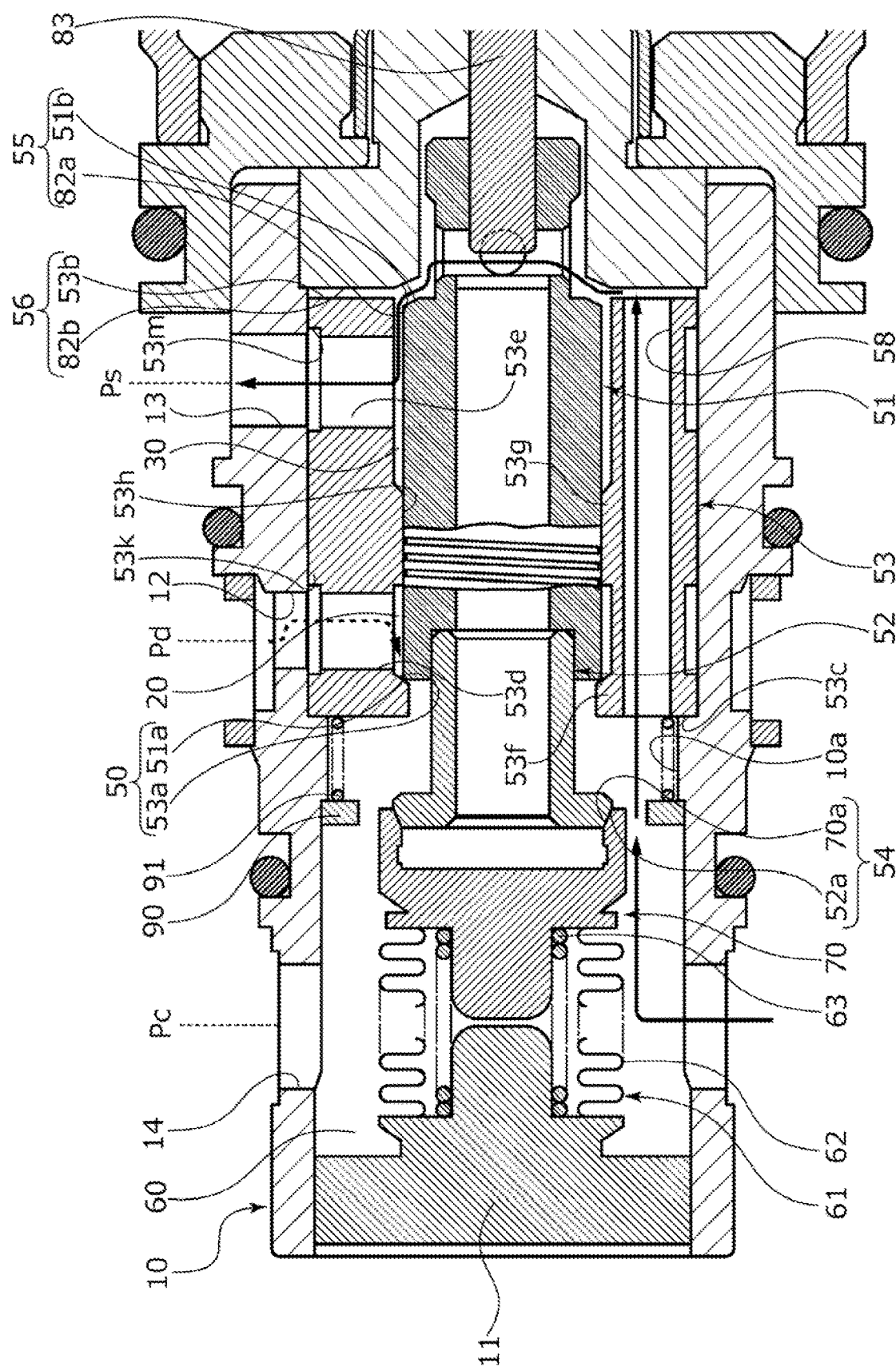
FIG. 5 is an enlarged cross-sectional view illustrating a state where the main valve is closed and the CS valve is opened when the capacity control valve according to the embodiment is in the maximum energized state.

In more details, the main valve chamber 20 and the Pd port 12 communicate with each other via a Pd communication hole 53d as a discharge communication hole, which is formed in a left axial end portion of the CS valve body 53, and an annular groove portion 53k (refer to FIGS. 3 to 5). In addition, the auxiliary valve chamber 30 and the Ps port 13 communicate with each other via a Ps communication hole 53e as a suction communication hole, which is formed in a right axial end portion of the CS valve body 53, and an annular groove portion 53m (refer to FIGS. 3 to 5).

As illustrated in FIG. 2, the pressure sensitive body 61 mainly includes a bellows core 62 where a coil spring 63 is built in and the adapter 70 which is provided in a right axial end portion of the bellows core 62, and a left axial end of the bellows core 62 is fixed to the partition adjustment member 11.

In addition, the pressure sensitive body 61 is disposed in the pressure sensitive chamber 60, and the right axial end 70a of the adapter 70 is seated on the pressure sensitive valve seat 52a of the pressure sensitive valve member 52 by the biasing force of the coil spring 63 and the bellows core 62 which moves the adapter 70 rightward in the axial direction. Incidentally, the following is unillustrated for convenience of description, and for example, when the suction pressure Ps in the intermediate communication passage 57 is high, such as after the variable displacement compressor M is left without use for a long time, the pressure sensitive body 61 is contracted to separate the right axial end 70a of the adapter 70 from the pressure sensitive valve seat 52a of the pressure sensitive valve member 52, so that the pressure sensitive valve 54 is opened and the control pressure Pc can be quickly released to the auxiliary valve chamber 30 through the intermediate communication passage 57 and the through-holes 51c of the main and auxiliary valve body 51.

As illustrated in FIG. 2, the main and auxiliary valve body 51 has a substantially cylindrical shape. The pressure sensitive valve member 52 as a separate body formed in a substantially cylindrical shape and in a substantially turret shape in a side view is inserted into and fixed to a left axial end portion of the main and auxiliary valve body 51 in a substantially sealed manner, and the drive rod 83 is inserted into and fixed to the right axial end portion of the main and auxiliary valve body 51 in a substantially sealed manner. The main and auxiliary valve body 51, the pressure sensitive valve member 52, and the drive rod 83 move integrally in the axial direction.

As illustrated in FIGS. 2 and 3, the CS valve body 53 has a substantially cylindrical shape and is provided with a first annular protrusion portion 53f that protrudes inward in the radial direction from an inner peripheral surface of the left axial end portion of the CS valve body 53, and the main valve seat 53a is formed in a right surface in the axial direction of the first annular protrusion portion 53f. In addition, the CS valve body 53 is provided with a second annular protrusion portion 53g that protrudes inward in the radial direction from an inner peripheral surface between the Pd communication hole 53d and the Ps communication hole 53e, and a sliding portion 53h that is slidable against an outer peripheral surface of the main and auxiliary valve body 51 in a substantially sealed state is formed in an inner peripheral surface of the second annular protrusion portion 53g. Incidentally, the inner peripheral surface of the second annular protrusion portion 53g, namely, the sliding portion 53h and the outer peripheral surface of the main and auxiliary valve body 51 are slightly separated from each other in the radial direction to form a very small gap therebetween, and the main and auxiliary valve body 51 is smoothly movable relative to the CS valve body 53 in the axial direction. Furthermore, incidentally, the first annular protrusion portion 53f has a smaller inner diameter than the second annular protrusion portion 53g, and the CS valve body 53 is externally fitted to the main and auxiliary valve body 51 from the left in the axial direction.

In addition, the CS valve body 53 is provided with the annular groove portion 53k that is formed in an outer peripheral surface of the left axial end portion thereof, the Pd communication hole 53d that penetrates therethrough inward in the radial direction from the annular groove portion 53k, the annular groove portion 53m that is formed in an outer peripheral surface of the right axial end portion thereof, and the Ps communication hole 53e that penetrates therethrough inward in the radial direction from the annular groove portion 53m. Incidentally, the annular groove portions 53k and 53m are formed to correspond to the axial positions of the Pd port 12 and the Ps port 13 of the valve housing 10. In addition, the CS valve body 53 is disposed such that the Pd communication hole 53d and the Ps communication hole 53e and the Pd port 12 and the Ps port 13 of the valve housing 10 coincide in phase in a circumferential direction with each other so as to be aligned with each other in the radial direction. Incidentally, since the annular groove portions 53k and 53m are provided, the phases may not necessarily coincide with each other.

In addition, a CS communication passage 58 as a communication passage penetrating through the CS valve body 53 in the axial direction is formed in the CS valve body 53 at a position that is different from the position of a through-hole into which the main and auxiliary valve body 51 is inserted and which extends in the axial direction, and that is shifted to an outer diameter side, and at a circumferential position where the Pd communication hole 53d and the Ps communication hole 53e are not formed. The CS communication passage 58 is open to the pressure sensitive chamber 60 at the left axial end 53c of the CS valve body 53, and can communicate with the auxiliary valve chamber 30 at the right axial end 53b of the CS valve body 53 when the CS valve 56 is opened.

Incidentally, when the CS valve 56 is closed (refer to FIGS. 2 to 4), an end surface of the right axial end 53b of the CS valve body 53 comes into contact with the CS valve seat 82b formed in the fixed core 82, and when the CS valve 56 is opened (refer to FIG. 5), the left axial end 53c of the CS valve body 53 comes into contact with a right axial end surface of the annular protrusion portion 10a of the valve housing 10, so that the axial positions of the CS valve body 53 when the CS valve 56 is opened and closed are determined.

In addition, the CS valve body 53 is biased rightward in the axial direction, namely, in a valve closing direction of the CS valve 56 by a coil spring 91 as biasing means. The coil spring 91 is a compression spring. A left axial end of the coil spring 91 is in contact with a right axial end surface of a fixing member 90 that has an annular shape and is internally fitted to a left side in the axial direction of the annular protrusion portion 10a of the valve housing 10, and a right axial end of the coil spring 91 is in contact with an outer diameter portion of the left axial end 53c of the CS valve body 53. An outer periphery of the coil spring 91 is slightly separated from the inner peripheral surface of the valve housing 10 in the radial direction.

Next, an operation of the capacity control valve V, mainly, an opening and closing operation of the main valve 50 and the CS valve 56 will be described.

First, a de-energized state of the capacity control valve V will be described. As illustrated in FIGS. 2 and 3, when the capacity control valve V is in a de-energized state, since the movable core 84 is pressed rightward in the axial direction by the biasing force of the coil spring 85 forming the solenoid 80 or the biasing force of the coil spring 63 and the bellows core 62, the drive rod 83, the main and auxiliary valve body 51, and the pressure sensitive valve member 52 move rightward in the axial direction, so that the step portion 51b on the right side in the axial direction of the main and auxiliary valve body 51 is seated on the auxiliary valve seat 82a of the fixed core 82 to close the auxiliary valve 55, and the left axial end 51a of the main and auxiliary valve body 51 separates from the main valve seat 53a, which is formed in the inner peripheral surface of the CS valve body 53, to open the main valve 50.

At this time, the biasing force $F_{sp1}$ of the coil spring 85 and the biasing force $F_{bel}$ of the pressure sensitive body 61 (i.e., force obtained by subtracting force based on the suction pressure Ps from the biasing force of the bellows core 62 and the coil spring 63) are applied rightward in the axial direction to the main and auxiliary valve body 51 via the drive rod 83 forming the solenoid 80 and the pressure sensitive valve member 52, respectively (i.e., with a rightward direction being positive, force $F_{rod}=F_{sp1}+F_{bel}$ is applied to the main and auxiliary valve body 51).

In addition, as illustrated in FIGS. 2 and 3, when the capacity control valve V is in a de-energized state, the left axial end 51a of the main and auxiliary valve body 51 and the main valve seat 53a formed in the inner peripheral surface of the CS valve body 53 separate from each other in the axial direction, and the biasing force $F_{sp2}$ of the coil spring 91 is applied to press the CS valve body 53 rightward in the axial direction, namely, in the valve closing direction of the CS valve 56, so that the right axial end 53b of the CS valve body 53 is seated on the CS valve seat 82b of the fixed core 82 to close the CS valve 56.

Next, an energized state of the capacity control valve V will be described. As illustrated in FIG. 4, when the capacity control valve V is in an energized state (i.e., during normal control, so-called duty control), if electromagnetic force $F_{sol}1$ generated by the application of a current to the solenoid 80 is greater than the force $F_{rod}$ (i.e., $F_{sol}1>F_{rod}$), since the movable core 84 is pulled toward a fixed core 82 side, namely, leftward in the axial direction, the drive rod 83 fastened to the movable core 84, the main and auxiliary valve body 51, and the pressure sensitive valve member 52 move together leftward in the axial direction, and the pressure sensitive body 61 is pressed leftward in the axial direction to be contracted, so that the step portion 51b on the right side in the axial direction of the main and auxiliary valve body 51 separates from the auxiliary valve seat 82a of the fixed core 82 to open the auxiliary valve 55, and the left axial end 51a of the main and auxiliary valve body 51 is seated on the main valve seat 53a of the CS valve body 53 to close the main valve 50.

At this time, in addition to the electromagnetic force $F_{sol}1$ toward the left in the axial direction and the force $F_{rod}$ toward the right in the axial direction, the biasing force $F_{sp2}$ of the coil spring 91 is applied to the main and auxiliary valve body 51 via the CS valve body 53 (i.e., with the rightward direction being positive, force $F_{rod}+F_{sp2}-F_{sol}1$ is applied to the main and auxiliary valve body 51).

During normal control of the capacity control valve V, when the opening degree or opening time of the main valve 50 is adjusted to control the flow rate of the fluid from the Pd port 12 to the Pc port 14, the current value is controlled such that the electromagnetic force $F_{sol}1$ generated by the application of a current to the solenoid 80 is greater than the force $F_{rod}$ (i.e., $F_{sol}1>F_{rod}$) and is less than force $F_{rod}+F_{sp2}$ (i.e., $F_{sol}1<F_{rod}+F_{sp2}$); and thereby the opening and closing of the main valve 50 can be controlled in a state where the closing of the CS valve 56 is maintained.

In addition, when the variable displacement compressor M is driven at the maximum capacity, the capacity control valve V is brought into a maximum energized state (i.e., energized state at the maximum duty during normal control) to cause electromagnetic force $F_{sol}2$ generated by the application of the maximum current to the solenoid 80 to be greater than the force $F_{rod}+F_{sp2}$ (i.e., $F_{sol}2>F_{rod}+F_{sp2}$), so that the main and auxiliary valve body 51 fastened to the drive rod 83 pushes the CS valve body 53 leftward in the axial direction and the main and auxiliary valve body 51 moves together with the CS valve body 53 leftward in the axial direction; and thereby, the right axial end 53b of the CS valve body 53 separates from the CS valve seat 82b of the fixed core 82 to open the CS valve 56. Accordingly, as the drive rod 83 moves while a closed state of the main valve 50 is maintained, the main and auxiliary valve body 51 moves together with the CS valve body 53 to open the CS valve 56, and the Pc port 14 and the Ps port 13 communicate with each other, namely, the control chamber 4 and the suction chamber 3 communicate with each other via the CS communication passage 58 formed in the CS valve body 53, so that the control pressure Pc can be quickly lowered to maintain the control pressure Pc and the suction pressure Ps at equal pressure. Therefore, the capacity control valve V having a high compression efficiency can be provided. In addition, even during startup of the variable displacement compressor M, the capacity control valve V is brought into a maximum energized state to open the CS valve 56 and to allow the Pc port 14 and the Ps port 13 to communicate with each other via the CS communication passage 58 formed in the CS valve body 53. Therefore, the capacity control valve V having a good fluid discharge function during startup can be provided.

In addition, since the CS valve body 53 is biased rightward in the axial direction, namely, in the valve closing direction of the CS valve 56 by the coil spring 91, when the current value is decreased, the CS valve body 53 can reliably move to a closed valve position, and the capacity control valve V can immediately return from the maximum energized state at the maximum duty to a state less energized than the maximum energized state (duty control).

In addition, since in the CS valve body 53, the Pd communication hole 53d and the Ps communication hole 53e that communicate with the Pd port 12 and the Ps port 13 is formed, the second annular protrusion portion 53g is formed on the inner peripheral surface between the Pd communication hole 53d and the Ps communication hole 53e, and the sliding portion 53h formed in the inner peripheral surface of the second annular protrusion portion 53g is slidable against the outer peripheral surface of the main and auxiliary valve body 51, a passage between the Pd port 12 and the Ps port 13 can be sealed with the sliding portion 53h of the second annular protrusion portion 53g of the CS valve body 53. Therefore, the capacity control valve V including the CS valve 56 can be simply configured.

Furthermore, since the CS valve body 53 is externally fitted to the main and auxiliary valve body 51, the main valve seat 53a is formed in the inner peripheral surface of the CS valve body 53, and the CS communication passage 58 through which the Pc port 14 and the Ps port 13 communicate with each other when the CS valve 56 is opened and closed is formed in the CS valve body 53, the capacity control valve V including the CS valve 56 can be configured more simply and compactly, and the main and auxiliary valve body 51 can move together with the CS valve body 53 while a closed state of the main valve 50 is reliably maintained.

The embodiment of the invention has been described above with reference to the drawings; however, the specific configuration is not limited to the embodiment, and the invention also includes changes or additions that are made without departing from the concept of the invention.

For example, in the above embodiment, since the left axial end 51a of the main and auxiliary valve body 51 comes into contact with the main valve seat 53a formed in the inner peripheral surface of the CS valve body 53, when the capacity control valve V is in a maximum energized state, while a closed state of the main valve 50 is maintained, the main and auxiliary valve body 51 pushes the CS valve body 53 leftward in the axial direction to move together therewith to open the CS valve 56; however, the invention is not limited to the configuration, and while a closed state of the main valve 50 is maintained, the main and auxiliary valve body may push a portion other than the main valve seat of the CS valve body to move together therewith.

In addition, the above embodiment has described a mode where when the capacity control valve V is in an energized state at the maximum duty, the CS valve 56 is opened by the electromagnetic force $F_{sol}2$ which is generated by the application of the maximum current to the solenoid 80; however, the maximum energized state of the capacity control valve V which opens the CS valve 56 is not limited to being induced by the current value of the maximum current, and may be induced by a current value larger than the current value of duty control which closes the main valve 50 during normal control.

In addition, in the above embodiment, the CS communication passage 58 penetrates through the CS valve body 53 in the axial direction; however, the CS communication passage 58 is not limited to the configuration, and as long as the CS communication passage 58 is opened and closed by operation of the CS valve body 53, for example, the CS communication passage 58 may penetrates the CS valve body 53 in the radial direction, or may be formed in the main and auxiliary valve body 51, the valve housing 10, or the like.

In addition, the CS valve body 53 may not be provided with the annular groove portions 53k and 53m, and the Pd port 12 and the Ps port 13 of the valve housing 10 may communicate directly with the Pd communication hole 53d and the Ps communication hole 53e.

In addition, an example where the main and auxiliary valve body 51 and the pressure sensitive valve member 52 are formed as separate bodies has been described; however, both may be integrally formed.

In addition, the communication passage through which the control chamber 4 and the suction chamber 3 of the variable displacement compressor M communicate directly with each other, and the fixed orifice may not be provided.

In addition, in the above embodiment, the auxiliary valve may not be provided, and the step portion on the right side in the axial direction of the main and auxiliary valve body may serve as a support member receiving an axial load, and does not necessarily require a sealing function.

In addition, the auxiliary valve chamber 30 may be provided opposite to the solenoid 80 in the axial direction, and the pressure sensitive chamber 60 may be provided on a solenoid 80 side.

In addition, the coil spring 91 is not limited to a compression spring, and may be a tensile spring and have a shape other than a coil shape.

In addition, instead that the coil spring is used inside the pressure sensitive body 61, the bellows core 62 may have biasing force.

REFERENCE SIGNS LIST

1 Casing
2 Discharge chamber
3 Suction chamber
4 Control chamber
10 Valve housing
10a Annular protrusion portion
11 Partition adjustment member
12 Pd port (discharge port)
13 Ps port (suction port)
14 Pc port (control port)
20 Main valve chamber
30 Auxiliary valve chamber
50 Main valve
51 Main and auxiliary valve body (main valve body)
52 Pressure sensitive valve member
52a Pressure sensitive valve seat
53 CS valve body
53a Main valve seat
53d Pd communication hole (discharge communication hole)
53e Ps communication hole (suction communication hole)
53h Sliding portion
54 Pressure sensitive valve
55 Auxiliary valve
56 CS valve
57 Intermediate communication passage
58 CS communication passage (communication passage)
60 Pressure sensitive chamber
61 Pressure sensitive body
62 Bellows core
63 Coil spring
70 Adapter
80 Solenoid
82 Fixed core
82a Auxiliary valve seat
82b CS valve seat
83 Drive rod (rod)
90 Fixing member
91 Coil spring (biasing member)
Pc Control pressure
Pd Discharge pressure
Ps Suction pressure
V Capacity control valve

The invention claimed is:

1. A capacity control valve comprising:
a valve housing provided with a discharge port through which a discharge fluid at a discharge pressure passes, a suction port through which a suction fluid at a suction pressure passes, and a control port through which a control fluid at a control pressure passes;
a rod driven by a solenoid; and
a main valve that includes a main valve seat and a main valve body to open and close communication between the discharge port and the control port in accordance with a movement of the rod,
wherein the capacity control valve further comprises a CS valve that includes a CS valve seat and a CS valve body to open and close communication between the control port and the suction port,
the CS valve body is disposed so as to be movable relative to the main valve body, and
the main valve body and the CS valve body move together in accordance with the movement of the rod while a closed state of the main valve is maintained.

2. The capacity control valve according to claim 1,
wherein the CS valve body is externally fitted to the main valve body, and the main valve seat is formed in an inner peripheral surface of the CS valve body.

3. The capacity control valve according to claim 1,
wherein the CS valve body is biased in a valve closing direction of the CS valve.

4. The capacity control valve according to claim 1,
wherein a sliding portion that is slidable against an outer peripheral surface of the main valve body is formed in an inner peripheral surface of the CS valve body.

5. The capacity control valve according to claim 1,
wherein the CS valve body is provided with a communication passage that penetrates through the CS valve body in an axial direction.

6. The capacity control valve according to claim 1,
wherein the CS valve body is provided with a discharge communication hole and a suction communication hole that communicate with the discharge port and the suction port, respectively.

7. The capacity control valve according to claim 2,
wherein the CS valve body is biased in a valve closing direction of the CS valve.

8. The capacity control valve according to claim 2,
wherein a sliding portion that is slidable against an outer peripheral surface of the main valve body is formed in an inner peripheral surface of the CS valve body.

9. The capacity control valve according to claim 2,
wherein the CS valve body is provided with a communication passage that penetrates through the CS valve body in an axial direction.

10. The capacity control valve according to claim 2,
wherein the CS valve body is provided with a discharge communication hole and a suction communication hole that communicate with the discharge port and the suction port, respectively.

11. The capacity control valve according to claim 3,
wherein a sliding portion that is slidable against an outer peripheral surface of the main valve body is formed in an inner peripheral surface of the CS valve body.

12. The capacity control valve according to claim 3,
wherein the CS valve body is provided with a communication passage that penetrates through the CS valve body in an axial direction.

13. The capacity control valve according to claim 3,
wherein the CS valve body is provided with a discharge communication hole and a suction communication hole that communicate with the discharge port and the suction port, respectively.

14. The capacity control valve according to claim 4,
wherein the CS valve body is provided with a communication passage that penetrates through the CS valve body in an axial direction.

15. The capacity control valve according to claim 4,
wherein the CS valve body is provided with a discharge communication hole and a suction communication hole that communicate with the discharge port and the suction port, respectively.

16. The capacity control valve according to claim 5,
wherein the CS valve body is provided with a discharge communication hole and a suction communication hole that communicate with the discharge port and the suction port, respectively.

* * * * *